(12) United States Patent
Tack

(10) Patent No.: US 10,398,086 B2
(45) Date of Patent: Sep. 3, 2019

(54) RECTANGULAR BALER

(71) Applicant: CNH Industrial America LLC, New Holland, PA (US)

(72) Inventor: Johan Tack, Dentergem-Oeselgem (BE)

(73) Assignee: CNH Industrial America LLC, New Holland, PA (US)

( * ) Notice: Subject to any disclaimer, the term of this patent is extended or adjusted under 35 U.S.C. 154(b) by 609 days.

(21) Appl. No.: 14/909,266

(22) PCT Filed: Jul. 17, 2014

(86) PCT No.: PCT/EP2014/065365
§ 371 (c)(1),
(2) Date: Feb. 1, 2016

(87) PCT Pub. No.: WO2015/014626
PCT Pub. Date: Feb. 5, 2015

(65) Prior Publication Data
US 2016/0165804 A1 Jun. 16, 2016

(30) Foreign Application Priority Data

Aug. 1, 2013 (BE) .................................. 2013/0517

(51) Int. Cl.
*A01F 15/06* (2006.01)
*A01F 15/08* (2006.01)
(Continued)

(52) U.S. Cl.
CPC ........ *A01F 15/0841* (2013.01); *A01F 15/042* (2013.01); *A01F 15/06* (2013.01);
(Continued)

(58) Field of Classification Search
CPC .... A01F 15/0841; A01F 15/042; A01F 15/06; A01F 1/266; A01F 9/306; A01F 9/3021;
(Continued)

(56) References Cited

U.S. PATENT DOCUMENTS 3,513,651 A 5/1970 Hollyday et al.
4,615,238 A 10/1986 Cheatum
(Continued)

FOREIGN PATENT DOCUMENTS

EP 1350425 A1 10/2003
EP 2181581 A1 * 5/2010 ........... A01F 15/042
(Continued)

OTHER PUBLICATIONS

Range—P Neeter Drive Spiral Bevel Gearboxes, Power Jacks, p. 17 http://www.powerjacks.com/Downloads/Brochure/PJBGB-P-EN-01.pdf.

*Primary Examiner* — Jimmy T Nguyen
(74) *Attorney, Agent, or Firm* — Patrick M. Sheldrake; Peter K. Zacharias

(57) ABSTRACT

An agricultural baler has a plunger for compressing harvested material to a bale in a chamber, a crank mechanism connected to the plunger for the purpose of driving the plunger, wherein the crank mechanism comprises at least one first crank and at least one second crank, a drive mechanism for driving the first crank and the second crank, wherein the drive mechanism is configured such that, when the first and second crank are driven, the first crank and the second crank rotate in opposite directions.

14 Claims, 7 Drawing Sheets

(51) Int. Cl.
*A01F 15/04* (2006.01)
*B30B 9/30* (2006.01)
*B30B 1/26* (2006.01)

(52) U.S. Cl.
CPC .............. *B30B 1/266* (2013.01); *B30B 1/268* (2013.01); *B30B 9/306* (2013.01); *B30B 9/3021* (2013.01)

(58) Field of Classification Search
CPC ....... B30B 9/306; B30B 9/3021; B30B 1/266; B30B 1/268
USPC ......................................... 100/179, 282, 283
See application file for complete search history.

(56) References Cited

U.S. PATENT DOCUMENTS

| | | | |
|---|---|---|---|
| 4,825,760 A * | 5/1989 | Weddeling | ............ A01F 15/101 100/188 R |
| 5,894,718 A | 4/1999 | Hawlas et al. | |
| 6,477,945 B1 * | 11/2002 | Imanishi | .................. B30B 1/14 100/257 |
| 8,127,670 B2 | 3/2012 | Vu | |
| 9,204,596 B2 | 12/2015 | Van De Laarschot et al. | |
| 2012/0055443 A1 * | 3/2012 | Betzmeir | .............. F02B 75/065 123/197.4 |
| 2013/0047867 A1 * | 2/2013 | Van De Laarschot | ....................... B30B 9/3021 100/7 |
| 2014/0158002 A1 * | 6/2014 | O'Reilly | ............. A01F 15/0841 100/188 R |
| 2014/0305322 A1 | 10/2014 | Galant et al. | |

FOREIGN PATENT DOCUMENTS

| | | |
|---|---|---|
| EP | 2430906 A1 | 3/2012 |
| GB | 846397 A | 8/1960 |
| GB | 1318124 A | 5/1973 |
| GB | 2029314 A | 3/1980 |
| GB | 2187417 A | 9/1987 |

* cited by examiner

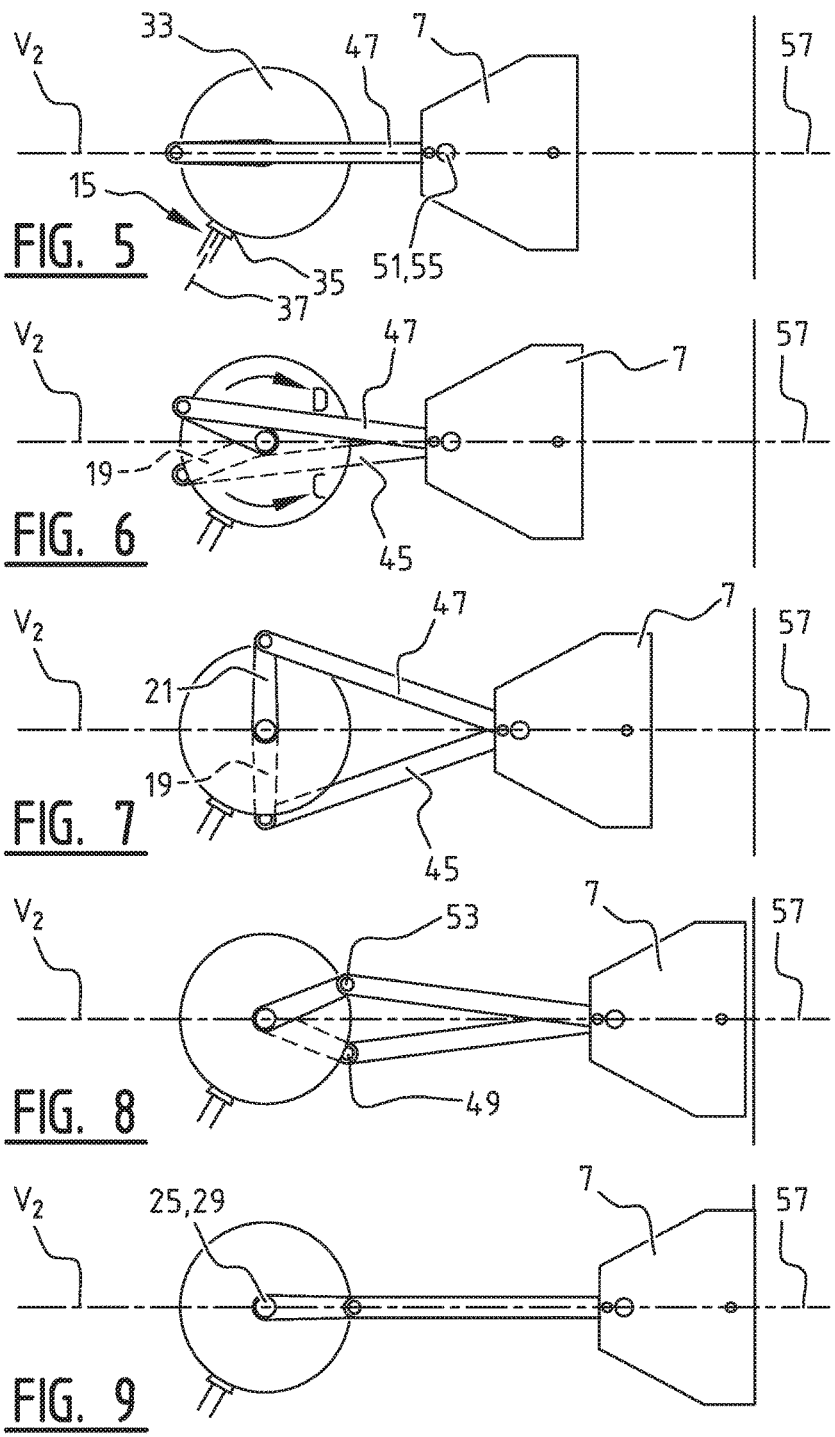

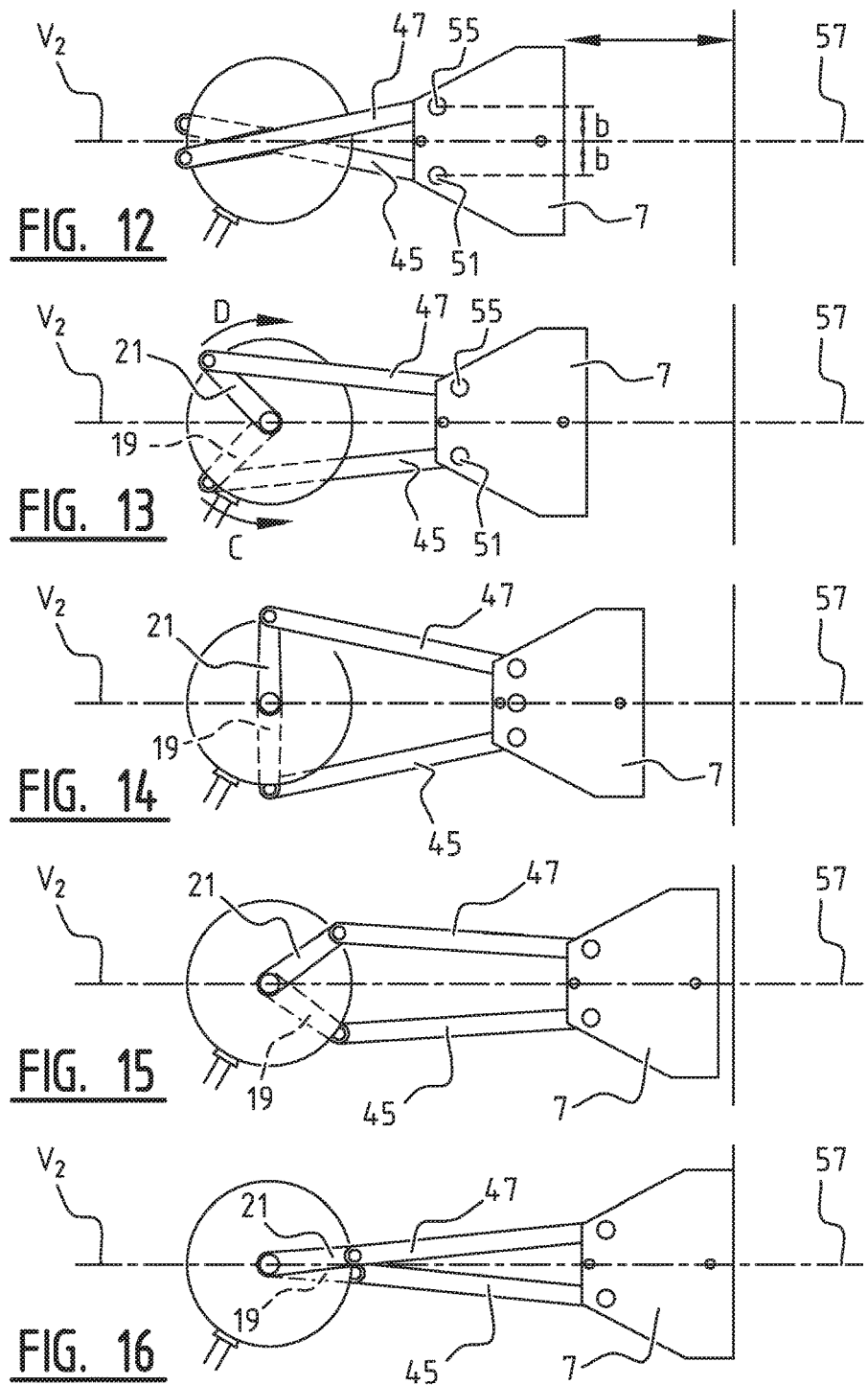

RECTANGULAR BALER

This application is the US National Stage filing of International Application Serial No. PCT/EP2014/065365 filed on Jul. 17, 2014 which claims priority to Belgian Application BE2013/0517 filed Aug. 1, 2013, each of which is incorporated herein by reference in its entirety.

TECHNICAL FIELD

The present invention relates to an agricultural baler, in particular a rectangular agricultural baler.

PRIOR ART

Rectangular agricultural balers are provided with a plunger for compressing harvested material to a bale in a chamber. In such a baler the plunger is moved reciprocally along a linear path in the chamber by means of a crank mechanism connected to the plunger. In this crank mechanism a rotating movement of an output shaft of a power take-off device, such as a Power Take-Off (PTO) of a tractor, is converted by means of a rotating crank to the reciprocal movement of the plunger along the linear path.

SUMMARY OF THE INVENTION

The agricultural baler according to the invention comprises a crank mechanism comprising:
 at least one first crank and at least one second crank;
 a drive mechanism for driving the first crank and the second crank;
 wherein the drive mechanism is configured such that, when the first and second crank are driven, the first crank and the second crank rotate in opposite directions.

In the baler according to the invention with a crank mechanism with cranks rotating in opposite directions it is possible to allow forces exerted on components of the baler by a first crank to act in opposite direction relative to forces exerted on components of the baler by a second crank. The provision of cranks rotating in opposite directions moreover provides the option of distributing forces. The option of distributing forces and having them act in opposite directions makes it possible to better balance forces occurring in the baler. The first crank and the second crank preferably rotate in opposite directions at the same rotation speed. The first crank and the second crank preferably rotate in counter-phase.

Particularly in an embodiment wherein the first crank and second crank rotate respectively in a plane extending at least in vertical direction it is possible in a baler according to the invention that, while a first crank has to be moved upward counter to gravitational force during rotation, a second crank rotating in opposite direction is co-displaced downward with the gravitational force. The gravitational force acting on the second crank then helps to move the first crank upward counter to the gravitational force. This is particularly advantageous during start-up of the baler. A particularly high start-up torque is required to move a crank upward from standstill counter to gravitational force. The tractor which drives the baler must be suitable to produce this start-up torque so that the tractor does not stall during start-up of the baler. The start-up torque required for start-up can be lower because the gravitational force acting on a crank which is moved downward from standstill helps during start-up to move upward counter to gravitational force a crank rotating in opposite direction. This has the advantage that the tractor which drives the baler can take a lighter form.

In a favourable embodiment of the baler according to the invention the first crank and the second crank are connected to the plunger by means of respectively a first transmission construction and a second transmission construction. This provides the option of distributing forces to be transmitted to the plunger over two transmission constructions, which can thereby take a simpler form. This moreover provides the option of distributing over the plunger forces and movements to be transmitted to the plunger.

In a preferred embodiment the respective transmission constructions thus engage at a distance from each other on the plunger. This makes it possible to distribute over the plunger the forces exerted by the two transmission constructions on the plunger in the direction of the linear path along which the plunger is moved reciprocally. This for instance makes it possible to prevent tilting of the plunger. This latter is advantageous in devices wherein the plunger is mounted such that tilting of the plunger results in additional friction. In addition, the transmission constructions engaging at a distance from each other on the plunger provides the option of indeed allowing the plunger to make a tilting movement in addition to a linear reciprocal movement. In a preferred embodiment the plunger is for this purpose mounted for tilting around a rotation axis and the respective transmission constructions engage at a distance from each other on the plunger on either side of the rotation axis. By having the cranks rotating in opposite directions rotate in this embodiment not in counter-phase but with a phase difference relative to counter-phase a tilting movement around the rotation axis is realized in addition to a linear reciprocal movement.

In a further favourable embodiment of the agricultural baler according to the invention, wherein the respective transmission constructions engage at a distance from each other on the plunger, the plunger is divided into at least a first plunger part and a second plunger part which are mounted displaceably relative to each other, and the first transmission construction is in engagement with the first plunger part and the second transmission construction is in engagement with the second plunger part. By having the cranks rotating in opposite directions rotate not in counter-phase but with a phase difference relative to counter-phase it is possible in this embodiment for the one plunger part to follow the other plunger part.

A favourable embodiment of the agricultural baler according to the invention provided with a first transmission construction and a second transmission construction is configured such that:
 the first transmission construction comprises a first drive rod; and
 the second transmission construction comprises a second drive rod.

During the transmission of force from a crank to the plunger by means of a drive rod in a rectangular baler the drive rod exerts a force in the direction of the linear path along which the plunger is moved reciprocally as well as in a direction transversely thereof. This transverse force has to be counteracted in order to move the plunger along the linear path thereof, for instance by means of a reactive force which occurs when this transverse force acts on a guide surface of a guide construction which guides the plunger along the linear path. In a baler according to the invention it is possible to distribute over two drive rods the forces exerted on the plunger by means of the crank mechanism and to have the transverse forces exerted by the two drive rods counteract each other while the forces exerted by the two drive rods in the direction of the linear path along which the plunger is moved reciprocally do on the contrary act in the same direction. This has the advantage that friction which occurs during transmission of forces to the plunger can be reduced.

The first drive rod is preferably in engagement at a first end thereof with the first crank and in engagement at the second end thereof with the plunger, and the second drive rod is in engagement at a first end thereof with the second crank and in engagement at the second end thereof with the plunger. The drive rods are alternatively connected via additional transmission members to the respective cranks and/or plunger.

In a further favourable embodiment of the baler according to the invention the drive mechanism comprises:
  a first drive line for driving the first crank;
  a second drive line for driving the second crank;
wherein
  the first drive line and the second drive line are coupled for simultaneous driving of the first crank and the second crank.

The provision of a first drive line for driving the first crank and a second drive line for driving the second crank, which drive lines are coupled for driving purposes, enables the simultaneous driving of the first and second crank by means of a single power take-off device, wherein forces which the power take-off device exerts on the first and second crank can be distributed over the first and second drive line. This has the advantage that the first and second drive line can individually take a lighter form. In addition, the provision of a first and a second drive line makes it possible to distribute and/or balance forces at the position of the coupling.

A distribution of the forces at the position of the coupling of the first and second drive lines is for instance advantageous when use is made, for coupling of the first and second drive lines, of a single toothed wheel as in the following favourable embodiment, wherein
  the first drive line comprises a first toothed wheel;
  the second drive line comprises a second toothed wheel; and wherein
  the first toothed wheel and the second toothed wheel are both in engagement with a coupling toothed wheel for a simultaneous driving of the first crank and the second crank.

During simultaneous driving of the first drive line and the second drive line by means of a power take-off device connected to the coupling toothed wheel the forces transmitted by means of the coupling toothed wheel are distributed over the first toothed wheel and the second toothed wheel. Because the first and the second toothed wheel are both in engagement with the coupling toothed wheel, the forces to be transmitted by the coupling toothed wheel to the first toothed wheel and second toothed wheel are distributed over two engaging locations. The individual teeth of the coupling toothed wheel can hereby take a lighter form relative to a device wherein a single crank with a single drive line is provided and all the forces to be transmitted by the coupling toothed wheel act at one engaging location.

This embodiment, wherein the coupling between the first drive line and the second drive line is provided by means of toothed wheels, also enables a reliable synchronization of the cranks and a simple central drive in opposite directions, such as in a particularly favourable embodiment wherein at least one of the first toothed wheel, second toothed wheel and coupling toothed wheel is a bevel wheel. It is possible by means of a bevel wheel to rotate two toothed wheels in opposite directions in two separate planes by means of one toothed wheel. Each of the first toothed wheel, the second toothed wheel and the coupling toothed wheel is here preferably a bevel wheel.

In a further favourable embodiment the rotation axis of the first toothed wheel and the rotation axis of the second toothed wheel coincide, and the rotation axis of the coupling toothed wheel extends perpendicularly relative to the rotation axis of the first toothed wheel and the rotation axis of the second toothed wheel. By means of this configuration two toothed wheels rotating in opposite directions to be driven centrally can be realized in simple and effective manner using at least one bevel wheel, preferably three bevel wheels. These two toothed wheels rotating in opposite directions when driven can be easily coupled, as respectively first toothed wheel of a first drive line of a first crank and as second toothed wheel of a second drive line of a second crank, to two cranks rotatable in opposite directions around a shared rotation axis running parallel to the rotation axes of the first toothed wheel and the second toothed wheel, for instance by means of a number of additional toothed wheels. In a preferred embodiment the first crank and the first toothed wheel are arranged on a first crankshaft, the second crank and the second toothed wheel are arranged on a second crankshaft and the coupling toothed wheel is arranged on an input shaft for connecting the coupling toothed wheel to an output shaft of a power take-off device. This embodiment results in a baler according to the invention provided with cranks rotating in opposite directions with an exceptionally simple and effective crank mechanism.

The present invention also relates to a method for driving a plunger of an agricultural baler, comprising of moving the plunger reciprocally along a linear path by means of a crank mechanism comprising at least one first crank and at least one second crank, wherein the first crank and the second crank are rotated in opposite directions.

BRIEF DESCRIPTION OF THE FIGURES

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which:

FIGS. 5-9 show simplified schematic side views of the crank mechanism of FIGS. 2-4 during driving thereof at successive moments in time;

FIGS. 12-16 are simplified schematic side views of the crank mechanism of FIGS. 2-4 during driving thereof at successive moments in time, wherein the crank mechanism engages in alternative manner on the plunger;

DETAILED DESCRIPTION OF PREFERRED EMBODIMENTS

Figure 1:
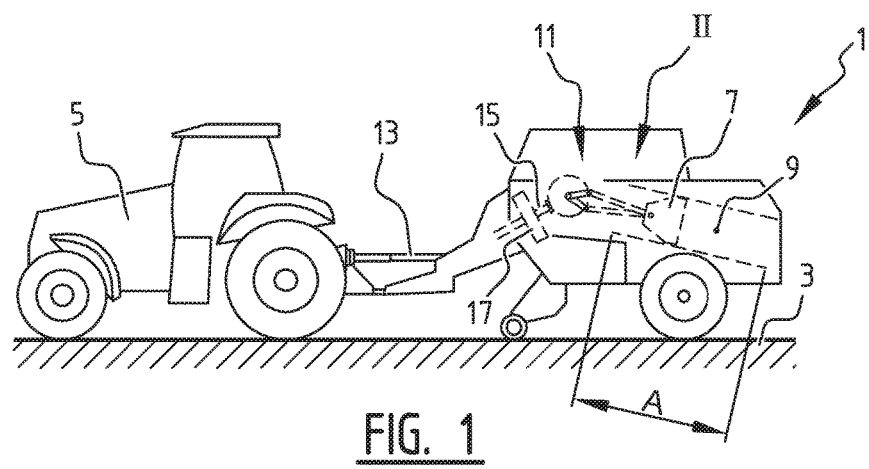
FIG. 1 is a schematic side view of an embodiment of a baler according to the invention, drawn and driven by a tractor.

FIG. 1 shows a rectangular agricultural baler 1. Baler 1 can be moved forward over ground surface 3 by means of a tractor 5. Baler 1 is provided with a plunger 7 for compressing harvested material to a bale in a chamber 9. In baler 1 plunger 7 is moved reciprocally along a linear path A in chamber 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

Figure 2:
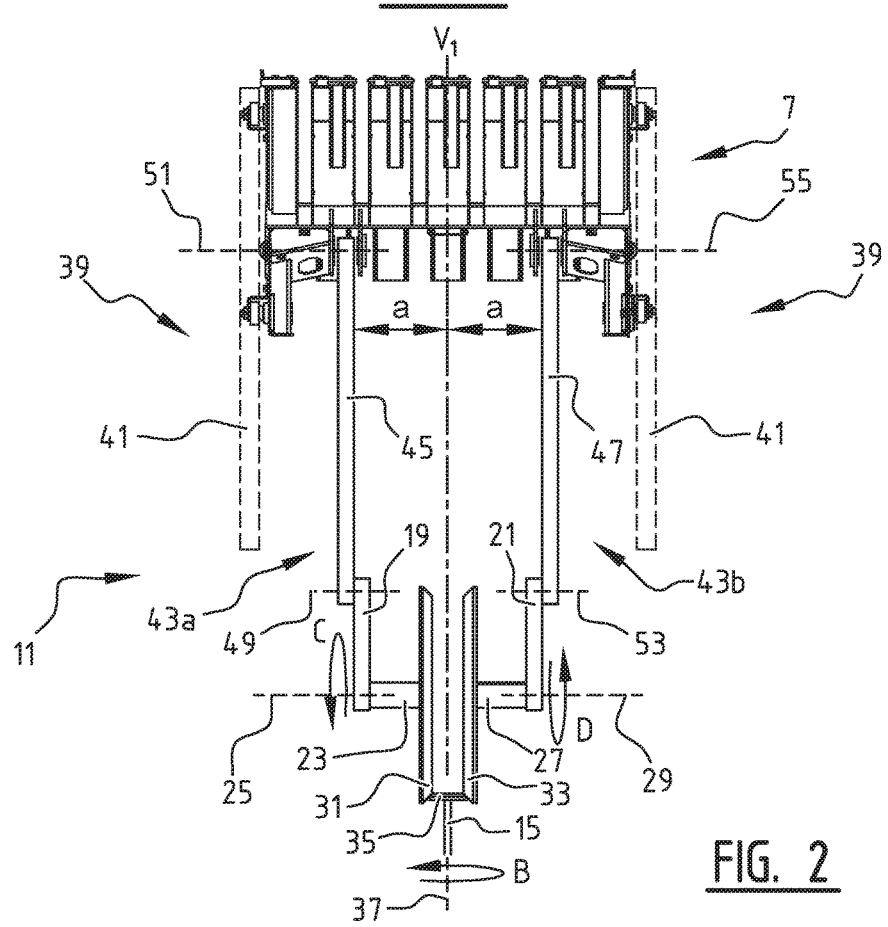
FIG. 2 is a schematic top view of the crank mechanism of the baler of FIG. 1.
Figure 3:
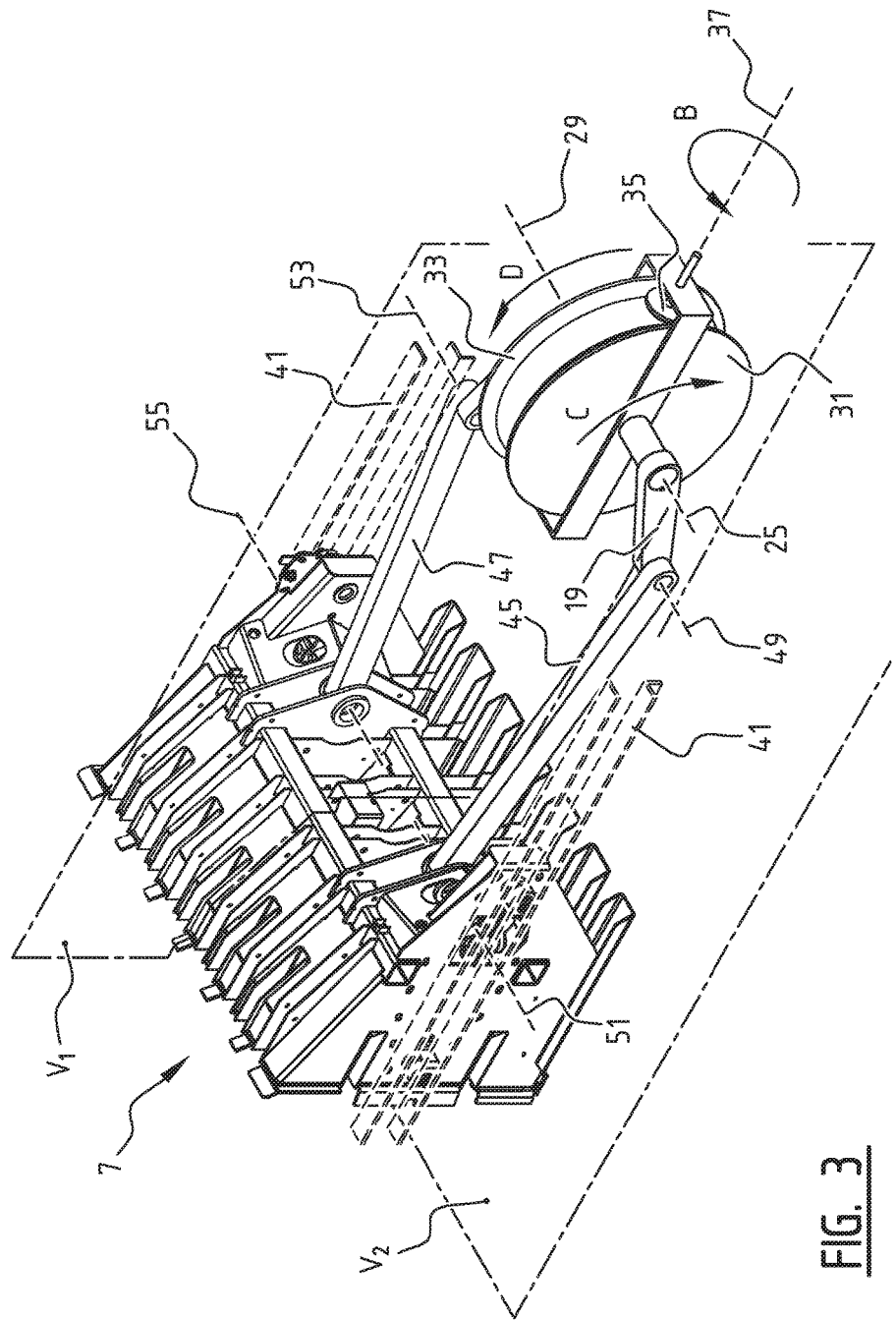
FIG. 3 is a perspective schematic view of the crank mechanism of FIG. 2.
Figure 4:
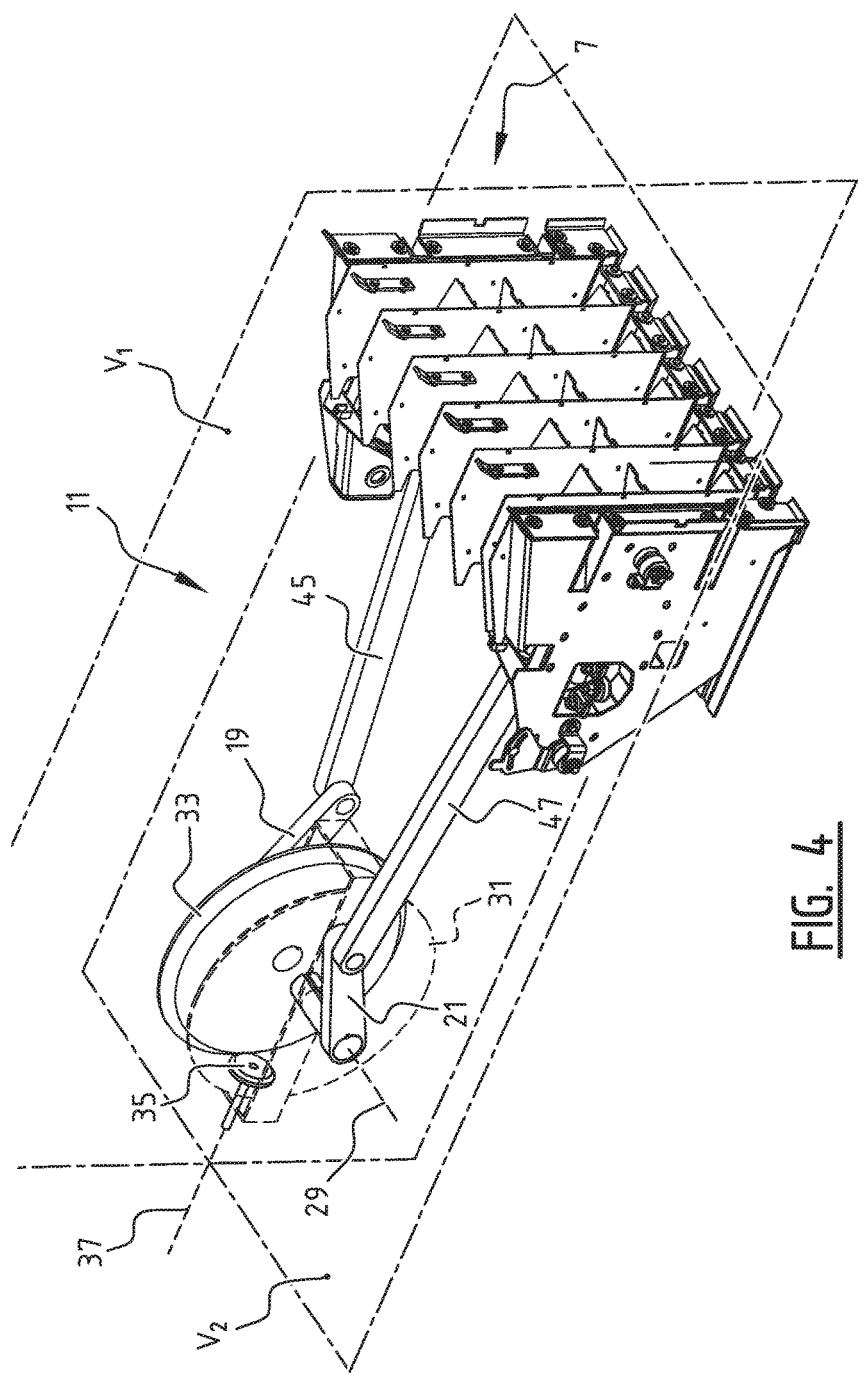
FIG. 4 is a perspective schematic view of the crank mechanism of FIG. 2 from another viewpoint.

FIGS. 2-4 show crank mechanism 11 of baler 1 in more detail. Crank mechanism 11 is shown with a first crank 19 and a second crank 21. First crank 19 is arranged at a first end thereof on a first crankshaft 23 and is rotatable around a first rotation axis 25. Second crank 21 is arranged at a first end thereof on a second crankshaft 27 and is rotatable around a second rotation axis 29. The first rotation axis 25 and the second rotation axis 29 coincide.

As shown, a first toothed wheel 31, particularly a bevel wheel, is arranged on first crankshaft 23 and a second toothed wheel 33, particularly a bevel wheel, on second crankshaft 27. The first toothed wheel 31 and the second toothed wheel 33 are coupled by means of a coupling toothed wheel 35, particularly a bevel wheel. The first toothed wheel 31 and the second toothed wheel 33 both engage on coupling toothed wheel 35. Coupling toothed wheel 35 is arranged on input shaft 15 of crank mechanism 11. Input shaft 15 is rotatable around third rotation axis 37 which intersects first rotation axis 25 and second rotation axis 29. A rotation of input shaft 15 in the direction of arrow B around the third rotation axis 37 results in a rotation in the direction of arrow C of the first toothed wheel 31 and the first crank 19 connected thereto via first crankshaft 23. A rotation of input shaft 15 in the direction of arrow B around the third rotation axis 37 additionally results in a rotation in the direction of arrow D of the second toothed wheel 33 and the second crank 21 connected thereto via second crankshaft 27. First crank 19 and second crank 21 hereby rotate in opposite directions during simultaneous driving via coupling toothed wheel 35. First crank 19 and second crank 21 rotate at the same rotation speed. Forces transmitted via input shaft 15 to coupling toothed wheel 35 are distributed over first toothed wheel 31 and second toothed wheel 33 by means of coupling toothed wheel 35. Forces transmitted via input shaft 15 to coupling toothed wheel 35 are hereby also distributed over the teeth of coupling toothed wheel 35 which are in engagement with first toothed wheel 31 and the teeth of coupling toothed wheel 35 which are in engagement with second toothed wheel 33. The first toothed wheel 31 forms a first drive line to first crank 19 and the second toothed wheel 33 forms a second drive line to second crank 21. Forces transmitted via input shaft 15 to coupling toothed wheel 35 are distributed via the first drive line and the second drive line over first crank 19 and second crank 21.

Crank mechanism 11 is further shown with a guide construction 39 in the form of a guide rail 41 along which plunger 7 can be translated and which defines the linear path A of plunger 7. Also shown is crank mechanism 11 with a first transmission construction 43*a* which connects first crank 19 to plunger 7 and with a second transmission construction 43*b* which connects second crank 21 to plunger 7 so that a rotation of cranks 19, 21 around rotation axes 25, 29 thereof results in a reciprocal movement of plunger 7 along the linear path A. The first transmission construction 43*a* is shown with a first drive rod 45 and the second transmission construction 43*b* with a second drive rod 47. First drive rod 45 is connected at a first end thereof for rotation around a fourth rotation axis 49 to the second end of first crank 19 and is connected at a second end thereof for rotation around a fifth rotation axis 51 to plunger 7. The second drive rod 47 is connected at a first end thereof for rotation around a sixth rotation axis 53 to the second end of second crank 21 and is connected at a second end thereof for rotation around a seventh rotation axis 55 to plunger 7. The fifth rotation axis 51 and seventh rotation axis 55 coincide and extend parallel to the first rotation axis 25 and second rotation axis 29.

As shown in FIGS. 2-4, first drive rod 45 and second drive rod 47 engage on plunger 7 at a distance from each other in the direction in which fifth rotation axis 51 and seventh rotation axis 55 extend. First drive rod 45 and second drive rod 47 are each in engagement with the plunger at a distance a from a central longitudinal plane V1 of crank mechanism 11. The forces exerted on plunger 7 by crank mechanism 11 are thus distributed over the parts of the plunger on either side of the central longitudinal plane V1. In FIG. 2 the central longitudinal plane V1 extends perpendicularly relative to the plane of the drawing.

FIGS. 5-9 are simplified side views of crank mechanism 11 as shown in FIGS. 2-4 during driving thereof at successive moments in time during a half stroke of plunger 7 from the rear dead centre of the stroke to the front dead centre of the stroke. The first crank rotates in the direction of arrow C, the second crank in the opposite direction indicated with arrow D.

FIGS. 5-9 shows that an axis of translation 57 intersects the coinciding first and second rotation axes 25, 29 of first crank 19 and second crank 21 and extends perpendicularly thereof. This axis of translation 57 represents the linear path which is defined by guide rail 41 and along which plunger 7 is moved reciprocally. As shown, the movement of first crank 19 and first drive rod 45 and the movement of second crank 21 and second drive rod 47 are mirror-symmetrical relative to a central transverse plane V2 of crank mechanism 11 which is defined by the coinciding first and second rotation axes 25, 29 and the axis of translation 57. The central transverse plane V2 extends perpendicularly of the central longitudinal plane V1. The axis of translation 57 is the intersecting line of central longitudinal plane V1 and central transverse plane V2.

The movement of the fourth rotation axis 49 and the movement of the sixth rotation axis 53 in the direction in which the axis of translation 57 extends are in phase. The movement of the fourth rotation axis 49 and the movement of the sixth rotation axis 53 in the direction perpendicularly of axis of translation 57 are in counter-phase.

Figure 10:
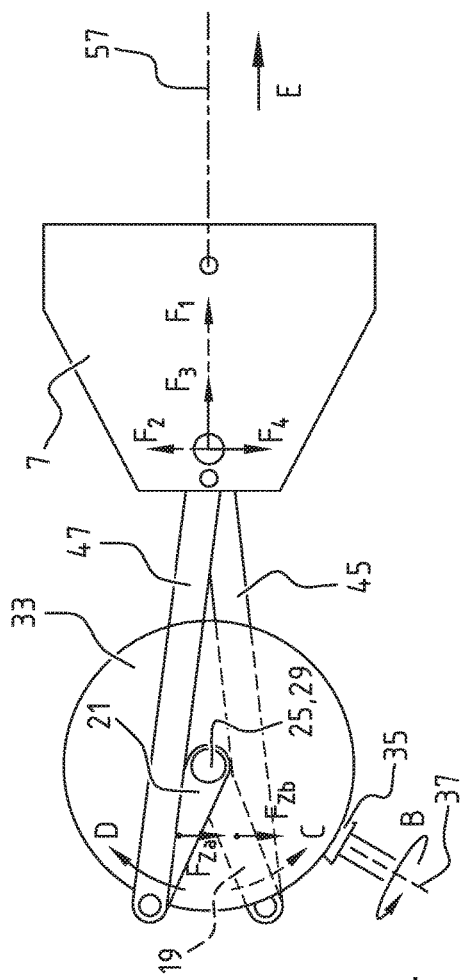
FIG. 10 shows in more detail the crank mechanism in the position as illustrated in FIG. 6.
Figure 11:
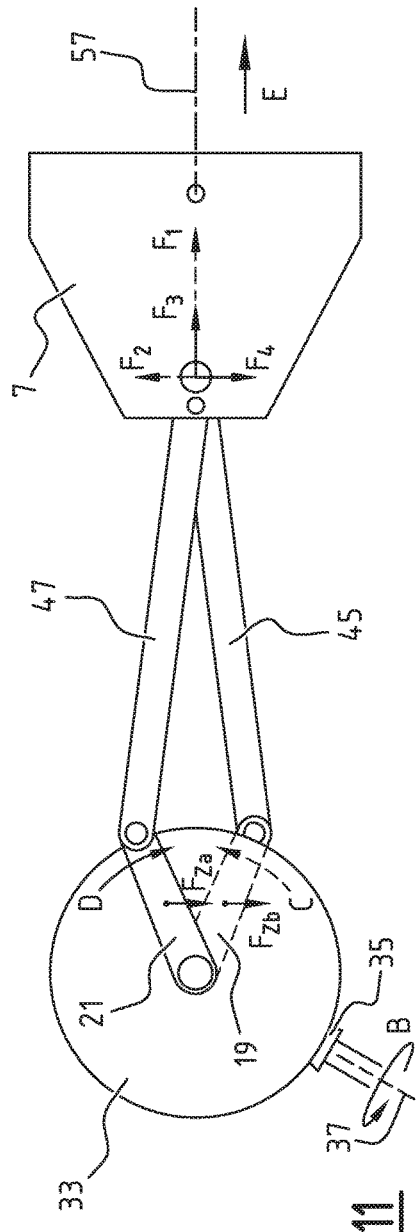
FIG. 11 shows in more detail the crank mechanism in the position as illustrated in FIG. 8.

FIG. 10 shows crank mechanism 11 in more detail in the position as shown in FIG. 6. FIG. 11 shows crank mechanism 11 in more detail in the position as shown in FIG. 8.

FIG. 10 shows that if the plane in which second crank 21 rotates extends in vertical direction, the gravitational force Fza counteracts the rotation of second crank 21 in the direction of arrow D. First crank 19 simultaneously rotates in the direction of arrow C. If the plane in which first crank 19 rotates extends in vertical direction, gravitational force Fzb assists the rotation of first crank 19. Via first toothed wheel 31 and coupling toothed wheel 34 Fzb helps to overcome Fza. From the position of crank mechanism 11 as shown in FIG. 11 the gravitational force Fzb counteracts the rotation of first crank 19 in the direction of arrow C, while the gravitational force Fza assists the rotation of second crank 21 in the direction of arrow D. Via second toothed wheel 33 and coupling toothed wheel 35 Fza then helps to overcome Fzb.

FIGS. 10 and 11 also show that, from the positions of crank mechanism 11 shown in these figures, during rotation of first crank 19 in the direction of arrow C first drive rod 45 exerts a force on plunger 7 with a component F1 in the direction in which the axis of translation 57 extends and a component F2 in the direction perpendicularly thereof. With simultaneous rotation of second crank 21 in the direction of arrow D the second drive rod 47 exerts a force on plunger 7 with a component F3 in the direction in which the axis of translation 57 extends and a component F4 in the direction perpendicularly thereof. As shown in FIGS. 10 and 11, components F1 and F3 act in the same direction and together push plunger 7 in the direction of arrow E. Components F2 and F4 act in opposite direction, so reducing the force exerted by the first drive rod 45 and the force exerted by the second drive rod 47 on guide rail 41 in the direction perpendicularly of the axis of translation 57.

FIGS. 12-16 are simplified side views of crank mechanism 11 as shown in FIGS. 2-4, wherein first drive rod 45 and second drive rod 47 engage at a distance from each other on plunger 7. In this embodiment the fifth rotation axis 51 and the seventh rotation axis 55 do not coincide. First drive rod 45 and second drive rod 47 each engage on plunger 7 at distance b from the central transverse plane V2. The forces exerted by crank mechanism 11 on plunger 7 are thus distributed over the parts of the plunger on either side of the central transverse plane V2. The central transverse plane V2 extends perpendicularly relative to the plane of the drawing.

Just as FIGS. 5-9, FIGS. 12-16 show crank mechanism 11 during driving thereof at successive moments in time during a half stroke of plunger 7 from the rear dead centre of the stroke to the front dead centre of the stroke. First crank 19 rotates in the direction of arrow C, second crank 21 in the opposite direction indicated with arrow D. First crank 19 and second crank 21 rotate at the same rotation speed.

Figure 17:
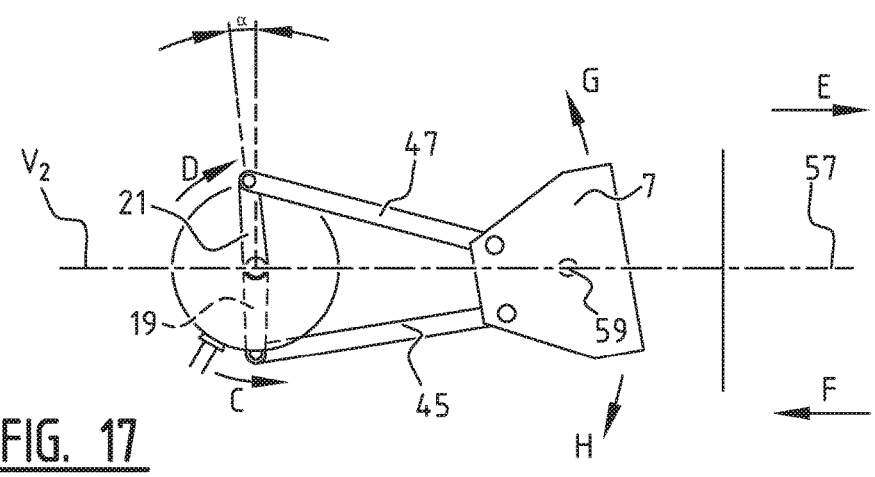
FIGS. 17 and 18 show two alternative embodiments of crank mechanism 11 and plunger 7 as illustrated in FIGS. 12-16.
Figure 18:
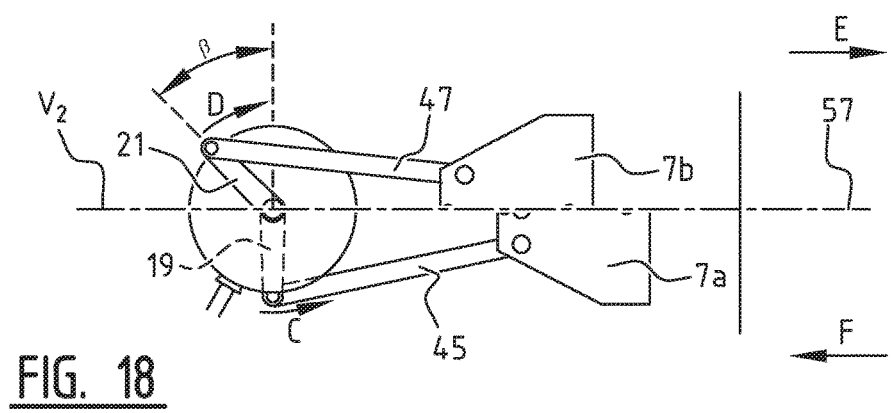

FIGS. 17 and 18 show two alternative embodiments of crank mechanism 11 and plunger 7 as illustrated in FIGS. 12-16.

FIG. 17 shows that plunger 7 is mounted for tilting around a rotation axis 59. First drive rod 45 and second drive rod 47 engage at a distance from each other on plunger 7 on either side of rotation axis 59. Also shown is that the cranks rotating in opposite directions are not rotated in counter-phase but with a phase difference a relative to counter-phase. During rotation of cranks 19, 21 in the direction of arrows C and D plunger 7 hereby not only performs a reciprocal translating movement along axis of translation 57 as according to arrows E and F, but also a reciprocal rotating movement around rotation axis 59 as according to arrows G and H. First crank 19 and second crank 21 rotate at the same rotation speed.

FIG. 18 shows that plunger 7 is divided into a first plunger part 7a and a second plunger part 7b mounted displaceably in the direction of arrows E and F relative to each other. First drive rod 45 is in engagement with first plunger part 7a and the second drive rod is in engagement with second plunger part 7b. Also shown is that the cranks rotating in opposite directions are not rotated in counter-phase but with a phase difference 13 relative to counter-phase. During rotation of cranks 19, 21 in the direction of arrows C and D plunger parts 7a and 7b hereby perform a reciprocal translating movement along axis of translation 57 as according to arrows E and F, wherein second plunger part 7b follows first plunger part 7a. First crank 19 and second crank 21 rotate at the same rotation speed.

Although the principles of the invention have been set forth above with reference to specific embodiments, it must be understood that this description is given solely by way of example and not as limitation to the scope of protection, which is defined by the appended claims.

The invention claimed is:

1. An agricultural baler, comprising:
a plunger for compressing harvested material to a bale in a chamber;
a crank mechanism connected to the plunger for the purpose of driving the plunger, the crank mechanism comprises: at least one first crank and at least one second crank and a drive mechanism for driving the first crank and the second crank;
the drive mechanism comprises, a first drive line for driving the first crank and a second drive line for driving the second crank, the first drive line comprises a first toothed wheel and the second drive line comprises a second toothed wheel;
wherein the drive mechanism is configured such that, when the first and second crank are driven, the first crank rotates in a first direction and the second crank simultaneously rotates in a second direction, the first direction opposite from the second direction;
wherein the first drive line and the second drive line being coupled for simultaneous driving of the first crank and the second crank;
wherein the first toothed wheel and the second toothed wheel are both in engagement with a coupling toothed wheel for a simultaneous driving of the first crank and the second crank; and
wherein at least one of the first toothed wheel, the second toothed wheel and the coupling toothed wheel is a bevel wheel.

2. The agricultural baler of claim 1, wherein the first crank and the second crank rotate respectively in a plane extending at least in a vertical direction.

3. The agricultural baler of claim 1, wherein the first crank and the second crank are connected to the plunger by respectively a first transmission construction and a second transmission construction.

4. The agricultural baler of claim 3, wherein the respective transmission constructions engage at a distance from each other on the plunger.

5. The agricultural baler of claim 4, wherein:
the plunger is mounted for tilting around a rotation axis; and
the respective transmission constructions engage at a distance from each other on the plunger on either side of the rotation axis.

6. The agricultural baler of claim 4, wherein
the plunger is divided into at least a first plunger part and a second plunger part which are mounted displaceably relative to each other; and
the first transmission construction is in engagement with the first plunger part and the second transmission construction is in engagement with the second plunger part.

7. The agricultural baler of claim 4, wherein
the first transmission construction comprises a first drive rod;
the second transmission construction comprises a second drive rod;
the first drive rod is in engagement at a first end thereof with the first crank and in engagement at the second end thereof with the plunger; and
the second drive rod is in engagement at a first end thereof with the second crank and in engagement at the second end thereof with the plunger.

8. The agricultural baler of claim 1, wherein each of the first toothed wheel, the second toothed wheel and the coupling toothed wheel is a bevel wheel.

9. The agricultural baler of claim 1, wherein
a rotation axis of the first toothed wheel and a rotation axis of the second toothed wheel coincide;
a rotation axis of the coupling toothed wheel extends perpendicularly relative to the rotation axis of the first toothed wheel and the rotation axis of the second toothed wheel.

10. The agricultural baler of claim 9, wherein:
the first crank and the first toothed wheel are arranged on a first crankshaft;
the second crank and the second toothed wheel are arranged on a second crankshaft; and
the coupling toothed wheel is arranged on an input shaft for connecting the coupling toothed wheel to an output shaft of a power take-off device.

11. The agricultural baler of claim 1, wherein movement of the first and second cranks during rotation of the first and second cranks is mirror-symmetrical relative to a central transverse plane.

12. The agricultural baler of claim 1, wherein the plunger comprises a single piece plunger, and the first and second cranks are connected to the plunger by respective first and second transmission constructions, the first and second transmission constructions engage the plunger at a distance from each other and a central transverse plane.

13. The agricultural baler of claim 1, wherein the first and second cranks are connected to the plunger by respective first and second transmission constructions, the first and second transmission constructions engage the plunger at a distance from each other and a central transverse plane, and a phase difference between the first and second cranks generates a tilting of the plunger during driving of the first and second cranks.

14. A method for driving a plunger of an agricultural baler, the method comprising:
simultaneously driving a first toothed wheel and a second toothed wheel with a coupling toothed wheel;
driving at least one first crank with the first toothed wheel;
driving at least one second crank with the second toothed wheel; and
moving the plunger reciprocally along a linear path by the at least one first crank and the at least one second crank,
wherein the at least one first crank is rotated in a first direction and the at least one second crank is simultaneously rotated in a second direction, the first direction opposite from the second direction;
wherein at least one of the first toothed wheel, the second toothed wheel and the coupling toothed wheel is a bevel wheel.

* * * * *